(12) United States Patent
Kim et al.

(10) Patent No.: US 7,983,294 B2
(45) Date of Patent: Jul. 19, 2011

(54) METHOD OF TRANSMITTING AND RECEIVING A MESSAGE VIA AN UPLINK CHANNEL IN A WIRELESS MOBILE COMMUNICATION SYSTEM

(75) Inventors: Hak Seong Kim, Seoul (KR); Bong Hoe Kim, Gyeonggi-do (KR); Joon Kui Ahn, Seoul (KR); Dong Youn Seo, Seoul (KR); Dong Wook Roh, Seoul (KR); Jung Hoon Lee, Seoul (KR); Young Dae Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 549 days.

(21) Appl. No.: 12/064,320

(22) PCT Filed: Aug. 23, 2006

(86) PCT No.: PCT/KR2006/003316
§ 371 (c)(1),
(2), (4) Date: Sep. 18, 2008

(87) PCT Pub. No.: WO2007/024101
PCT Pub. Date: Mar. 1, 2007

(65) Prior Publication Data
US 2009/0016266 A1   Jan. 15, 2009

Related U.S. Application Data

(60) Provisional application No. 60/711,088, filed on Aug. 23, 2005.

(30) Foreign Application Priority Data

Jan. 20, 2006  (KR) .................. 10-2006-0006372

(51) Int. Cl.
*H04J 3/14* (2006.01)
(52) U.S. Cl. ....................................... 370/462; 455/515
(58) Field of Classification Search .................. 370/461, 370/462; 455/515
See application file for complete search history.

(56) References Cited

U.S. PATENT DOCUMENTS

| 6,643,318 B1 | 11/2003 | Parsa et al. |
| 2005/0014508 A1 | 1/2005 | Moulsley et al. |
| 2009/0011786 A1 * | 1/2009 | Lee et al. ............. 455/522 |

FOREIGN PATENT DOCUMENTS

| WO | WO 03/100988 | 12/2003 |
| WO | WO 2004/023674 | 3/2004 |

* cited by examiner

*Primary Examiner* — Melvin Marcelo
(74) *Attorney, Agent, or Firm* — Lee, Hong, Degerman, Kang & Waimey

(57) ABSTRACT

A method of transmitting a message via an uplink access channel in a wireless communication system is disclosed. The method includes initiating a first preamble access procedure with Node B, receiving from Node B a first acknowledgement indication with respect to the first access preamble procedure, transmitting to Node B a first message upon receipt of the first acknowledgement indication, and receiving from Node B a second acknowledgment indication regarding the first message.

14 Claims, 7 Drawing Sheets

METHOD OF TRANSMITTING AND RECEIVING A MESSAGE VIA AN UPLINK CHANNEL IN A WIRELESS MOBILE COMMUNICATION SYSTEM

CROSS-REFERENCE TO RELATED APPLICATIONS

This application is a 371 U.S. national stage application of International Application No. PCT/KR2006/003316, filed on Aug. 23, 2006, which claims priority to Korean Application No. 10-2006-0006372, filed on Jan. 20, 2006, and U.S. Provisional Application Ser. No. 60/711,088, filed on Aug. 23, 2005, the contents of which are incorporated by reference herein in their entirety.

TECHNICAL FIELD

The present invention relates to a method of transmitting and receiving a message, and more particularly, to a method of transmitting and receiving a message via an uplink channel in a wireless mobile communication system.

BACKGROUND ART

FIG. 1 illustrates a network structure of a universal mobile telecommunication system (UMTS). The UMTS comprises a user equipment (also referred to as a mobile station, a terminal, a mobile subscriber station, an access terminal, and a mobile terminal), a UMTS terrestrial radio access network (UTRAN), and a core network (CN). The UTRN is comprised of a radio network sub-systems (RNS), and each RNS comprised of a radio network controller (RNC) and Node B which is controlled by the RNC. Here, Node B can also be referred to as a base station, an access network, a base terminal, and a base station controller. Each Node B includes at least one cell.

FIG. 2 illustrates a structural diagram of a wireless interface protocol between a UE and a UTRAN. Referring to FIG. 2, the wireless interface protocol is horizontally represented by a physical layer, a data link layer, and a network layer. Vertically, a user plane for data transmission and a control plane for control signal transmission are illustrated.

The protocol layers shown in FIG. 2, namely, Layer 1 (L1), Layer 2 (L2), and Layer 3 (L3), are modeled after an open system interconnection (OSI) which is widely known in wireless communication system.

The details of each layer as illustrated in FIG. 2 are as follows. The physical layer (L1) uses physical channel to provide information transfer service to upper layers. The physical layer is connected to a medium access channel (MAC), which is also referred to as Layer 2 (L2), by a transport channel. The data between the physical layer and the MAC channel are communicated via the transport layer. Further, the data are transmitted via the physical channel between the physical.

On the layer higher than the physical layer, the MAC of L2 uses a logical channel to provide service to a radio link control (RLC) layer which is also part of L2. The RLC of L2 provides reliable data transmission and is able to perform segmentation and concatenation of a service data unit (SDU) transmitted from the upper layer.

A radio resource control (RRC), which is part of Layer 3 (L3), is defined on the control plane. The RRC controls the logical channel, transport channel, and physical channel associated with configuration, re-configuration, and release of radio bearers (RB). Here, RB signifies service provided by L2 for transmission of data between the UE and the UTRAN.

Further, the configuration of the RB signifies setting parameters related to necessary protocol layer and channel for providing a specified service. In other words, RB configuration signifies configuring more detailed parameters and operation techniques.

DISCLOSURE OF THE INVENTION

Accordingly, the present invention is directed to a method of transmitting and receiving a message via an uplink channel in a wireless mobile communication system that substantially obviates one or more problems due to limitations and disadvantages of the related art.

An object of the present invention is to provide a method of transmitting a message via an uplink access channel in a wireless communication system.

Another object of the present invention is to provide a method of transmitting a message via a downlink access channel in a wireless communication system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of transmitting a message via an uplink access channel in a wireless communication system includes initiating a first preamble access procedure with Node B, receiving from Node B a first acknowledgement indication with respect to the first access preamble procedure, transmitting to Node B a first message upon receipt of the first acknowledgement indication, and receiving from Node B a second acknowledgment indication regarding the first message.

In another aspect of the present invention, a method of transmitting a message via a downlink access channel in a wireless communication system includes responding to a first preamble access procedure initiated by a user equipment (UE), transmitting to the UE a first acknowledgement indication with respect to the first access preamble procedure, receiving from the UE a first message after transmitting the first acknowledgement indication, and transmitting to the UE a second acknowledgment indication regarding the first message.

In a further aspect of the present invention, a method of transmitting a message via an uplink access channel in a wireless communication system includes initiating a first preamble access procedure with Node B, receiving from Node B a first acknowledgement indication with respect to the first access preamble procedure, transmitting to Node B a first message upon receipt of the first acknowledgement indication, and initiating with Node B a second preamble access procedure by transmitting at least one preamble, wherein a transmit power of a first preamble of the second preamble access procedure is set according to a transmit power of a last access preamble of the first preamble access procedure or of the first message.

Yet, in another aspect of the present invention, a method of transmitting a message via an uplink access channel in a wireless communication system includes initiating a first preamble access procedure with Node B, receiving from Node B a first acknowledgement indication with respect to the first access preamble procedure, transmitting to Node B a first message upon receipt of the first acknowledgement indication, and transmitting a second message to Node B, wherein a transmit power of the second message is set according to a transmit power of a last access preamble of the first preamble access procedure or of the first message.

In another aspect of the present invention, a method of transmitting a message via a downlink access channel in a wireless communication system includes responding to a first preamble access procedure to a user equipment (UE), transmitting to the UE a first acknowledgement indication with respect to the first access preamble procedure, receiving from the UE a first message after transmitting the first acknowledgement indication, and responding to a second preamble access procedure by receiving at least one preamble transmitted by the UE, wherein a transmit power of a first preamble of the second preamble access procedure is set according to a transmit power of a last access preamble of the first preamble access procedure or of the first message.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

A random access channel (RACH) is a part of a transport channel of a wideband code division multiple access (WCDMA). The RACH is a channel used to transmit a short length data in uplink direction. Furthermore, the RACH can be used to transmit a part of a RRC message, such as a RRC connection request message, a cell update message, and a URA update message. In addition, the RACH transport channel can be used to map logical channels, such as a common control channel (CCCH), a dedicated control channel (DCCH), and a dedicated traffic channel (DTCH). Moreover, the RACH transport channel can be mapped to a physical channel such as a physical RACH (PRACH).

Figure 1:
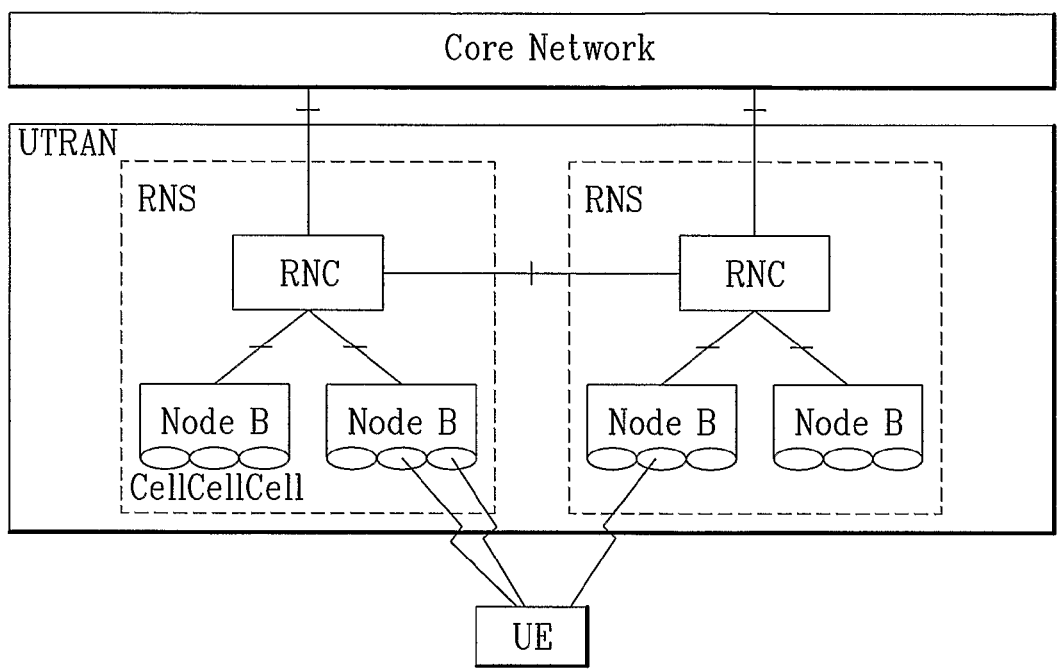
FIG. 1 illustrates a network structure of a universal mobile telecommunication system (UMTS)
Figure 2:
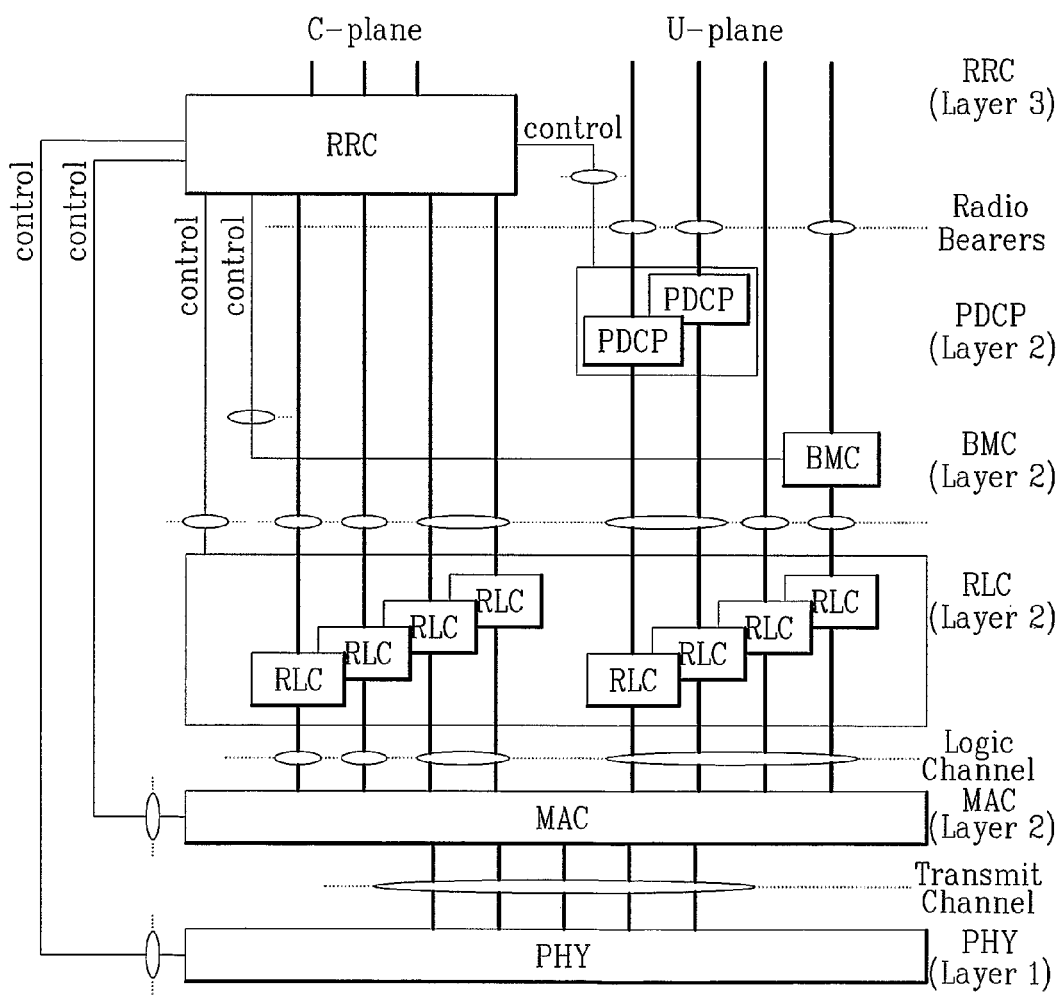
FIG. 2 illustrates a structural diagram of a wireless interface protocol between a UE and a UTRAN.
Figure 3:
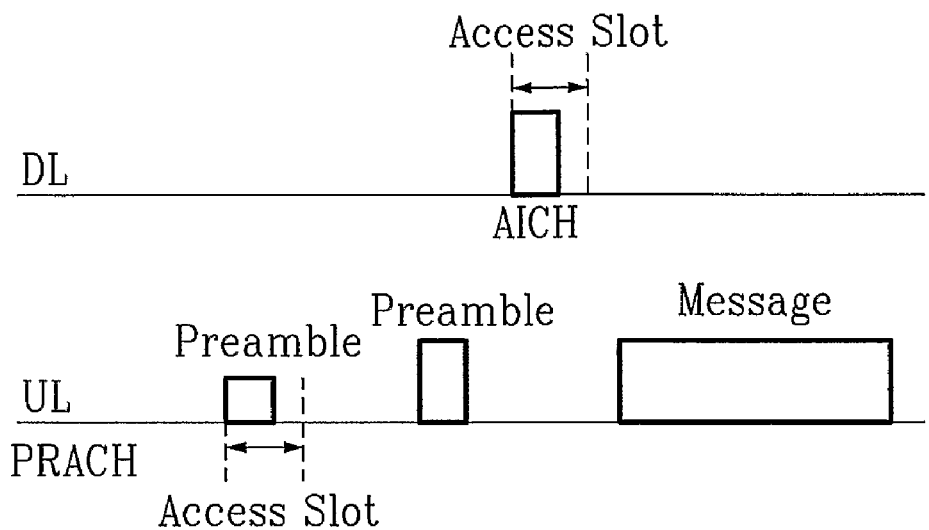
FIG. 3 illustrates a diagram of a transmission scheme related to a PRACH.

FIG. 3 illustrates a diagram of a transmission scheme related to a PRACH. Referring to FIG. 3, the PRACH can be classified by a preamble and a message part. The preamble is used to control transmit power, which can also be referred to as power ramping, and collision from transmissions of other UEs. As for the message part, the message part is used to transmit a MAC protocol data unit (PDU) being transmitted from the MAC layer to the physical layer.

In operation, if the UE receives a command from the MAC layer to transmit data through the PRACH, the UE first selects one access slot and one signature from the physical layer and transmits a preamble on the PRACH to Node B during the selected access slot using the selected signature. The preamble can have a length of 1.33 ms and as discussed, can be transmitted during the selected access slot. Here, the signature used by the preamble is one signature out of 16 available signatures.

After Node B receives the preamble from the UE, Node B responds by transmitting an acquisition indicator (AI) on an acquisition indicator channel (AICH). The AI is transmitted using the signature selected by the UE in transmitting the preamble to Node B during the access slot. Here, the AI can indicate positive acknowledgement (ACK) or negative acknowledgement (NACK) of the transmitted preamble.

If the UE receives the AI indicating ACK via the AICH, the UE can use an orthogonal variable spreading factor (OVSF) code corresponding to the selected signature to transmit the message part having a length of 10 ms or 20 ms. If, however, the UE receives the AI indicating NACK via the AICH, the MAC layer on the UE side can command the UE to retransmit the preamble on the PRACH after a specified time period. Alternatively, if the UE fails to receive any response corresponding to the preamble (e.g., does not receive the AI), the UE can retransmit the preamble during a subsequent access slot using higher transmit power than the transmit power used for previous transmission (e.g., power ramping).

Figure 4:
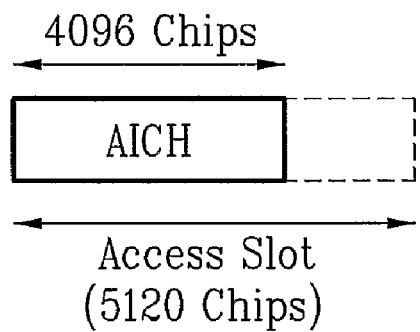
FIG. 4 illustrates a downlink physical channel, AICH.

FIG. 4 illustrates a downlink physical channel, AICH. The AICH transmits 16 symbol signatures $S_i$ (i=0, 1, ... 15) during an access slot having a length of 5120 chips. As discussed, the UE selects any one of 16 signatures ($S_0$-$S_{15}$) as $S_i$ and transmits the selected $S_i$ during 4096 chip duration. During the remaining 1024 chip duration, no transmission takes place and this period is considered 'OFF' period with respect to transmission. In the uplink direction, similar to downlink transmission, the preamble transmitted on the PRACH is transmitted via 16 symbol signatures $S_i$ (i=0, 1, ... 15) during the 4096 chip duration period.

If the UE establishes connection with Node B through the PRACH, the amount of data that can be transmitted from the UE to Node B can be limited. Further, the data amount to be transmitted to Node B can exceed the data amount that can be accommodated on the PRACH. To accommodate uplink transmission, an independent or a dedicated channel can be employed. However, since the capacity of the dedicated channel can far exceed the actual amount of data to be transmitted, channel resource can be wasted and cause efficient allocation of resources.

If transmission is continuously made on the RACH, the transmit power of the initial preamble is determined by the RRC layer. As such, the transmit power used to transmit previous signal cannot be used. Further, if the transmit power is incorrectly determined, time spent on power ramping increases along with transmission time on the PRACH.

Figure 5:
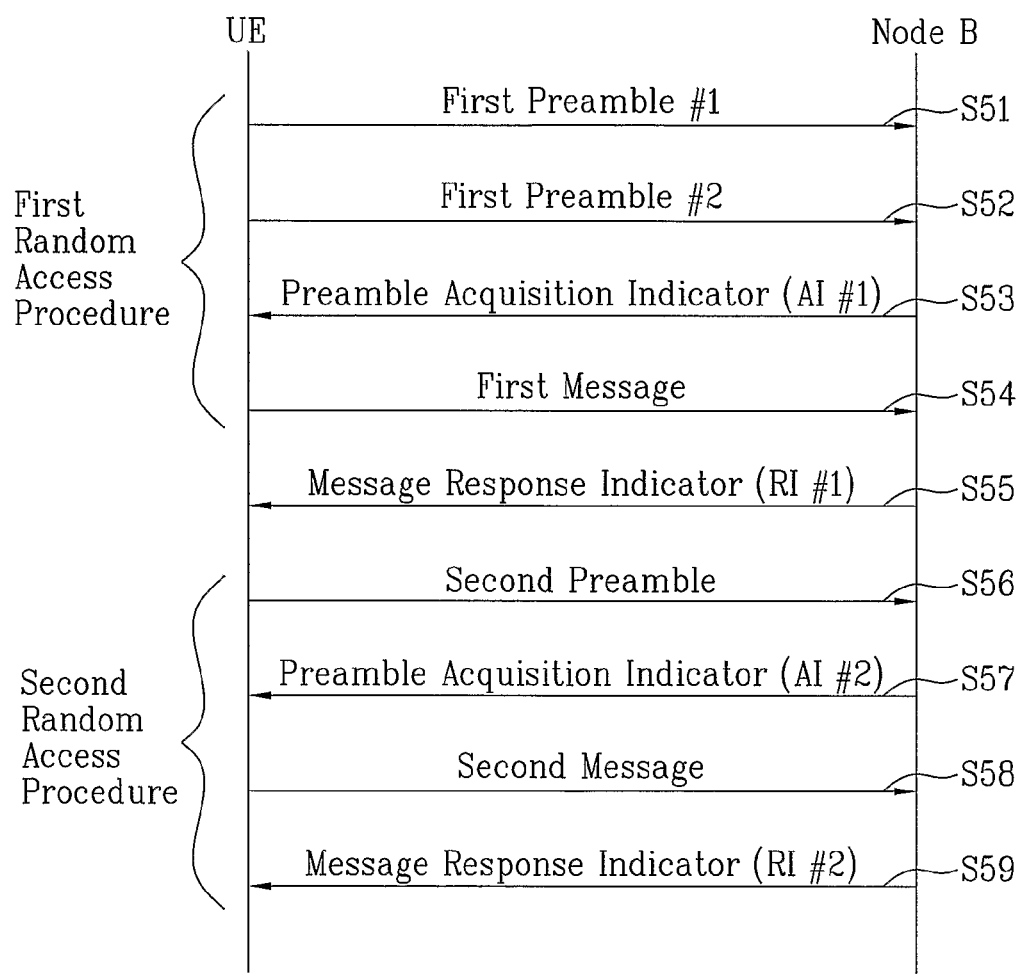
FIG. 5 illustrates transmission/reception of a message through an access channel according to an embodiment of the present invention.
Figure 6:
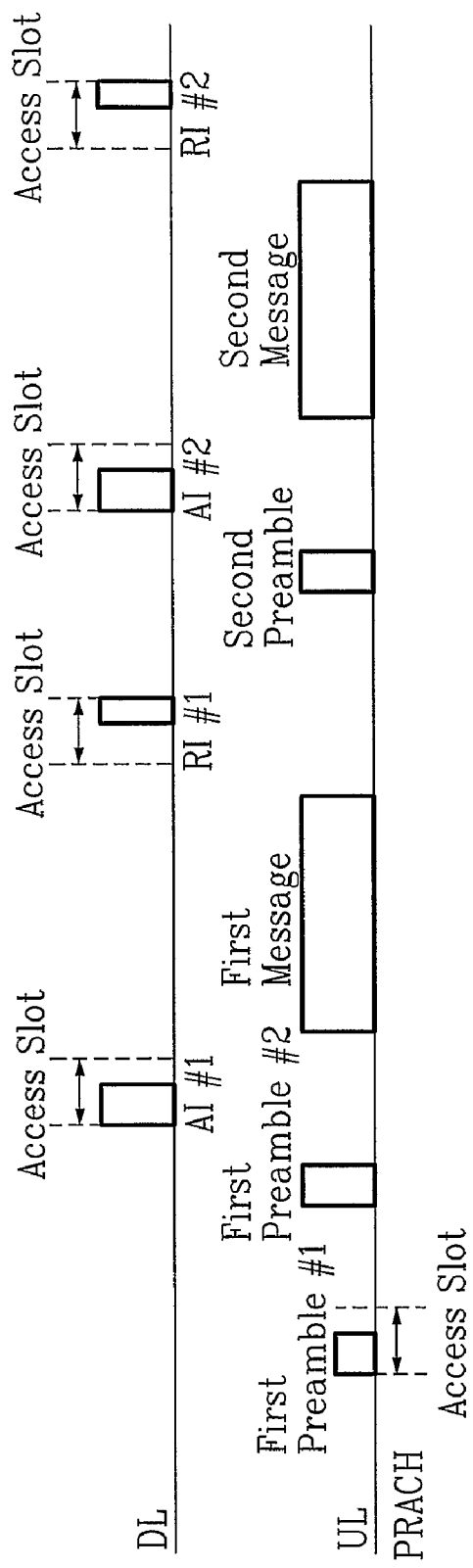
FIG. 6 illustrates transmission/reception of a message through an access channel according to an embodiment of the present invention.

FIG. 5 and FIG. 6 illustrate transmission/reception of a message through an access channel according to an embodiment of the present invention. More specifically, the embodiment introduced in FIGS. 5 and 6 relate to a wireless mobile communication system using a WCDMA scheme in which a message is transmitted and/or received using the PRACH.

In FIG. 5, steps S51-S54 refer to a first random access procedure between the UE and Node B using the PRACH. The random access procedure includes transmission of at least one access preamble from the UE to Node B, reception of a signal in response to the access preamble, and a transmission of a message to Node B.

In detail, the UE selects a signature $S_i$ from a plurality of signatures ($S_0$-$S_{15}$) and transmits a preamble (e.g., a first preamble #1) using the signature during an access slot (S51). At this time, a transmit power of the preamble can be determined according to the conventional method discussed above in which the transmit power is provided by the RRC layer.

With respect to the first preamble #1, if the UE receives a negative AI (e.g., the AI indicating NACK) from Node B during a downlink access slot, which corresponds to the uplink access slot used to transmit the first preamble #1, the UE can stop the random access procedure.

If the UE does not receive a positive AI (e.g., the AI indicating ACK) with respect to the first preamble #1, the UE can re-select a signature from the plurality of signatures ($S_0$-$S_{15}$) and transmit a first access preamble #2 during a subsequent access slot to Node B (S52). Here, the first access preamble #2 is a retransmission of the first access preamble #1. During the subsequent transmission, the transmit power of the first preamble #2 can be increased or power ramped in amount of $\Delta P_0$ [dB]. At this time, if the increased or power ramped transmit power exceeds an allowed maximum power threshold level, the UE can discontinue the uplink access procedure. In addition, a maximum number of transmissions for transmitting preambles or a maximum transmission time can be set so that if the transmission of the preamble exceeds this preset threshold, then the uplink access procedure can be ceased.

If the UE receives the positive AI (AI #1), acknowledging proper reception of the first preamble #2 during the uplink access slot, which corresponds to the downlink access slot (S53), the UE can send a message (e.g., a first message) having length of 10 ms or 20 ms via the corresponding uplink access slot (S54). A channel code used to transmit the first message can be any one of an OVSF code from an OVSF code tree used in mapping the first preamble #2. A transmit power of a control part of the first message can be determined by a power offset value $P_{p-m}$[dB] with respect to the transmit power of the first preamble #2. The transmit power of the data part can be derived from the transmit power of the control part.

Node B transmits a response indicator (RI) in response to the first message via the downlink access slot which corresponds to the uplink access slot used by the UE to transmit the first preamble #2 or the first message (S55). Preferably, the RI for the first message is transmitted on a specified portion of the downlink access slot. For example, the specified portion can be during 1024 chip duration.

Figure 7:
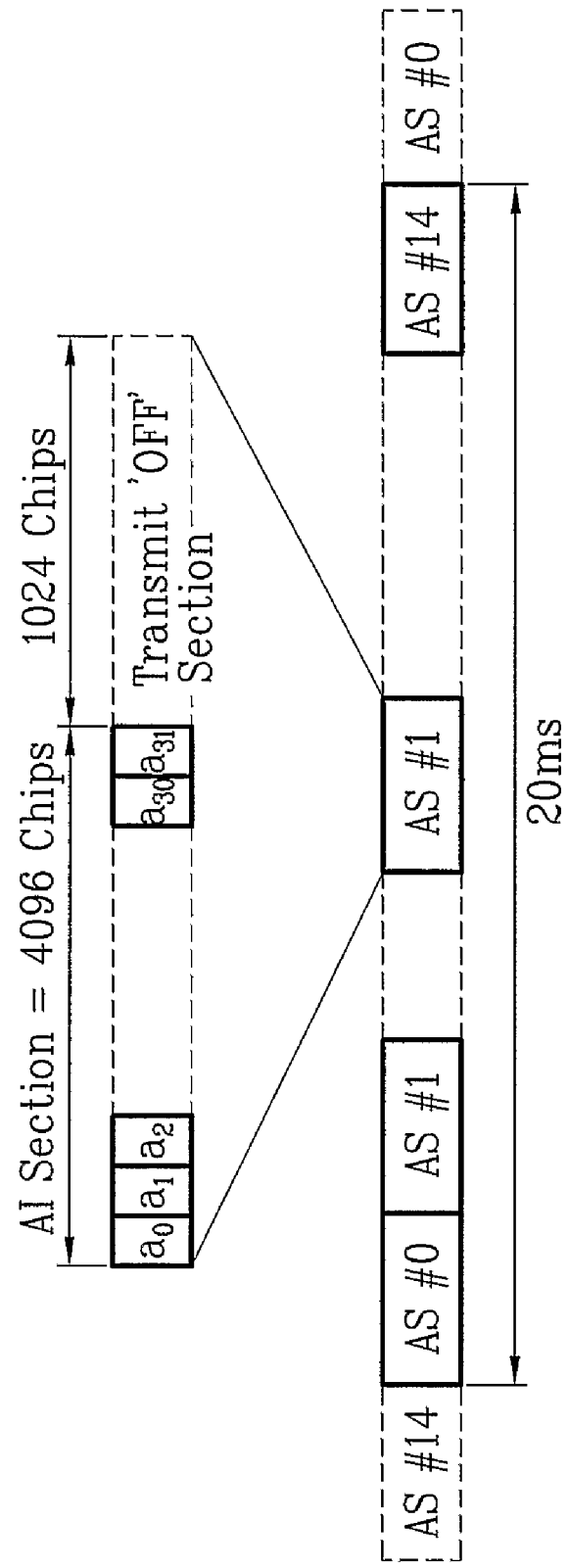
FIG. 7 is a diagram illustrating an acquisition indicator channel (AICH)

FIG. 7 is a diagram illustrating an acquisition indicator channel (AICH). The AICH is a physical channel having a fixed spreading factor (SF) in which 15 consecutive access slots each having a duration of 5120 chips are represented. Each access slot is divided into two (2) sections. The first section of the access slot is an AI section which includes 32 real-valued signals ($a_0, \ldots a_{31}$). The second section of the access slot a transmit power 'OFF' section having a duration of 1024 chips. The transmit power 'OFF' section is a reserved section which can be used for different purposes such as a RACH message indicator channel (RICH) for transmitting a RI message.

Figure 8:
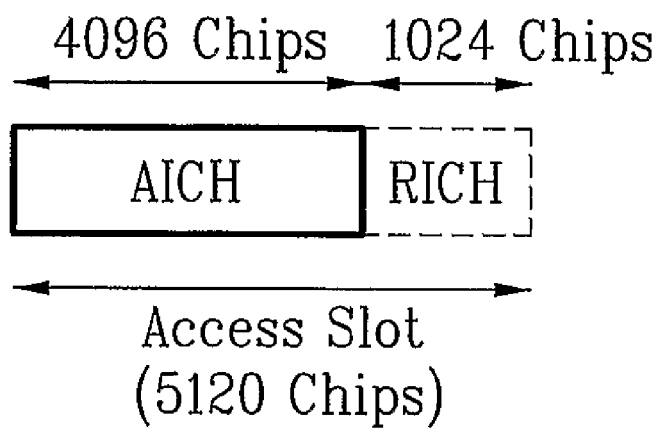
FIG. 8 is a diagram illustrating a downlink access slot according to an embodiment of the present invention.

FIG. 8 is a diagram illustrating a downlink access slot according to an embodiment of the present invention. In FIG. 8, the downlink access slot is classified into two sections. In other words, out of 5120 chips, a first section comprises 4096 chips which is allocated to the AICH for transmitting the AI. It is also possible for the first section to be used for transmitting the RI. As discussed, the AI is a response to the preamble from the UE. A second section of the downlink access slot is allocated to the RICH which used for transmitting the RI. As discussed, the RI is a response to the message transmitted by the UE.

Preferably, the signature used in transmission of the RI through the RICH relates to the signature used in transmission of the AI through the RICH. That is, the signature used in the transmission on the RI is same or relates to the signature used for mapping. Further, it is preferable that a same scrambling code is used for transmission of the RI on the RICH and the AI on the RICH. By using the same scrambling code, the UE can monitor the AI and the RI using the channel code and the scrambling code which are already known.

If the AI and the RI uses the same SF, the UE can transmit four (4) symbols during 1024 chip duration. Here, the signature can be a bi-orthogonal code comprising eight (8) real-valued signals ($a_0, \ldots a_7$). Here, a signature bit, $A_j$, can be expressed according to the following equation.

$$A_j = RI_0 * B_{0,j} + RI_1 * B_{1,j} + RI_2 * B_{2,j} + RI_3 * B_{3,j} \qquad \text{[Equation 1]}$$

In the equation, $RI_k$ can be 1, −1, or 0. For example, if the UE receives a positive acknowledgement response from Node B for the message sent from the UE, the value of $RI_k$ is 1.

Table 1 and Table 2 each illustrate a 4-symbol signature pattern ($B_{k,j}$) and a 8-symbol signature pattern ($B_{k,j}$), respectively. The signature patterns can be of any pattern having mutual orthogonal relationship with respect to different k values. The RI transmitted on the RICH can comprise various patterns according to signature pattern type(s) being used, a number of UEs to receive the RI, and a like.

TABLE 1

| k | $B_{k,0}$ | $B_{k,1}$ | $B_{k,2}$ | $B_{k,3}$ | $B_{k,4}$ | $B_{k,5}$ | $B_{k,6}$ | $B_{k,7}$ |
|---|---|---|---|---|---|---|---|---|
| 0 | 1 | 1 | 1 | 1 | 1 | 1 | 1 | 1 |
| 1 | 1 | 1 | −1 | −1 | 1 | 1 | −1 | −1 |
| 2 | 1 | 1 | 1 | 1 | −1 | −1 | −1 | −1 |
| 3 | 1 | 1 | −1 | −1 | −1 | −1 | 1 | 1 |

TABLE 2

| k | $B_{k,0}$ | $B_{k,1}$ | $B_{k,2}$ | $B_{k,3}$ | $B_{k,4}$ | $B_{k,5}$ | $B_{k,6}$ | $B_{k,7}$ | $B_{k,8}$ | $B_{k,9}$ | $B_{k,10}$ | $B_{k,11}$ | $B_{k,12}$ | $B_{k,13}$ | $B_{k,14}$ | $B_{k,15}$ |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | 1 | −1 | −1 | 1 | 1 | −1 | −1 | 1 | 1 | −1 | −1 | 1 | 1 | −1 | −1 |
| 2 | 1 | 1 | 1 | 1 | −1 | −1 | −1 | −1 | 1 | 1 | 1 | 1 | −1 | −1 | −1 | −1 |
| 3 | 1 | 1 | −1 | −1 | −1 | −1 | 1 | 1 | 1 | 1 | −1 | −1 | −1 | −1 | 1 | 1 |

TABLE 2-continued

| k | $B_{k,0}$ | $B_{k,1}$ | $B_{k,2}$ | $B_{k,3}$ | $B_{k,4}$ | $B_{k,5}$ | $B_{k,6}$ | $B_{k,7}$ | $B_{k,8}$ | $B_{k,9}$ | $B_{k,10}$ | $B_{k,11}$ | $B_{k,12}$ | $B_{k,13}$ | $B_{k,14}$ | $B_{k,15}$ |
|---|---|---|---|---|---|---|---|---|---|---|---|---|---|---|---|---|
| 4 | 1 | 1 | 1 | 1 | 1 | 1 | 1 | 1 | −1 | −1 | −1 | −1 | −1 | −1 | −1 | −1 |
| 5 | 1 | 1 | −1 | −1 | 1 | 1 | −1 | −1 | 1 | 1 | −1 | −1 | 1 | 1 | −1 | −1 |
| 6 | 1 | 1 | 1 | 1 | −1 | −1 | −1 | −1 | −1 | −1 | −1 | −1 | 1 | 1 | 1 | 1 |
| 7 | 1 | 1 | −1 | −1 | −1 | −1 | 1 | 1 | −1 | −1 | 1 | 1 | 1 | 1 | −1 | −1 |

As discussed above, the signature used in transmission of the RI through the RICH relates to the signature used in transmission of the AI through the AICH. That is, the signature used in the transmission on the RI is same or relates to the signature used for mapping. Alternatively, a variable signature for the RI, k, can be mapped to a channel code (e.g., OVSF code) used in the first message and can also be mapped to the signature of the preamble (i.e., first preamble #1) last to be transmitted which is used to transmit the first message. Preferably, the signature used for RI #1 is same as the signature used for the first preamble #1. The messages transmitted using different preamble signatures use different channel codes, and at the same time, the RIs transmitted on the RICH using different preamble signatures also use different signatures.

After the UE transmits the first message (S54), the UE receives the RI corresponding to the first message (RI #1) through the RICH during the access slot which corresponds to the transmission of the first message or the preamble of the first message (i.e., first preamble #2) (S55). Upon receipt of RI #1, the UE can initiate a second random access procedure, if necessary. For example, if the UE has data to transmit to Node B, the random access procedure can be initiated, starting with transmitting a preamble. It is preferable that the transmit power with the initial preamble in the second random access procedure considers the transmit power of a specific preamble or the first message transmitted to Node B during the first random access procedure. For example, the transmit power of the initial preamble in the second random access procedure is same as the transmit power of the last preamble or of the first message in the first random access procedure.

As discussed, the transmit power of the initial preamble in the second random access procedure can be determined based on the power offset. In other words, the transmit power of the initial preamble can be an increased transmit power or a decreased transmit power from that of the last preamble in the first random access procedure or the first message. Alternatively, the transmit power of the initial preamble in the second random access procedure can be determined based on a power ratio. In other words, the transmit power of the initial preamble can be a product of the power ratio and the transmit power of the last preamble in the first random access procedure or the transmit power of the first message. Here, the transmit power of the initial preamble in the second random access procedure can be determined based on any one of the power offset or the power ratio.

If the RI #1 indicates positive acknowledgement, the UE notifies the upper layers that it has received positive acknowledgement, and after a specified period, a second preamble associated with a second message having a different data than that of the first message is transmitted (S56). The specified period is determined by the upper layer and transmitted therefrom. In the alternative, according to another embodiment, if the second message is transmitted during the specified period, the second message can be transmitted directly without the second random access procedure.

If the RI #1 indicates negative acknowledgement or failed to receive the signature, the UE notifies failure of message transmission to the upper layer, and after a predetermined time period, transmits a preamble associated with a second message (i.e., a second preamble), which includes the same data as the data contained in the first message to Node B (S56). Preferably, the signature associated with the second preamble is same or has a specified relationship with the signature associated with the first preamble #1 so that both the UE and Node B have the signature information in advance. For example, if the first preamble #1 uses (n)th signature, the UE and Node B can agree in advance to use (n+a)th signature for the second preamble. Alternatively, the second preamble and the first preamble #1 can also use the same signature.

After RI #1 is received through the RICH, if a predetermined time period elapses or the second preamble is transmitted during a predetermined time period, the initial transmit power of the first message or the transmit power of the last preamble (i.e., first preamble #2) can be used as the transmit power of the second preamble, preferably. Further, it is preferable to set the initial transmit power of the second preamble offset from the transmit power of the first message or the first preamble #2. In other words, the initial transmit power of the second preamble can be slightly different (or offset) from the transmit power of the first message or the first preamble #2. Here, the difference is within a controlled range. Preferably, the offset value is zero (0) or a positive value, but can be a negative value. Further, the offset value can be determined from the RRC layer or the MAC layer or can also be from the physical layer.

If RI #1 received through the RICH indicates negative acknowledgement or failed reception of the signature, the transmit power of the second preamble can be the transmit power of the initial preamble of the first random access procedure or alternatively, can be determined according to a prescribed rule independent of the first random access procedure.

Following the transmission of the second preamble, Node B transmits AI #2 through the AICH during the downlink access slot corresponding to the second preamble (S57). If the AI #2 indicates positive acknowledgement, the UE transmits the second message to Node B (S58). As illustrated in FIG. 6, the data of the first message and the second message can be same or different. In other words, if the UE receives the AI (i.e., AI #1) corresponding to the first message, the data of the first message and the second message are different. In this case where the data of the first message and the second message are same, then the second message is a retransmission of the first message. As for the transmit power of the second message, the transmit power can be divided into a control part and a data part, and the transmit power can be determined in the same manner as the transmit power of the first message in which the transmit power is determined based on the transmit power of the corresponding preamble.

However, if the UE receives the AI (i.e., AI #1) which indicates negative acknowledgement, the data of the first message and the second message are same. If the RI #1 indicates negative acknowledgement or the UE failed to receive the signature, the transmit power of the second message can be same or similar to the transmit power of the first message. Node B can combine the second message with the first message and decoded the combined message or alternatively, decode the second message only.

Node B then transmits the response message (i.e., RI #2) through the RICH in response to the second message to the UE (S59). If the UE receives the AI indicating positive acknowledgement on the RICH during the access slot (e.g., slot for RI #2) corresponding to the second message, the physical layer of the UE notifies the MAC layer via the RICH that the UE has successfully received the message. If, however, the UE receives the AI indicating negative acknowledgement or fails to receive any signals (e.g., no AI) via the RICH, the physical layer of the UE notifies the MAC layer that the second message transmission failed. Thereafter, the UE can retransmit the preamble so as to retransmit the second message.

If the UE receives a message indicating negative acknowledgement via the RICH regarding a specific message, different from failing to receive the signature, the physical layer of the UE notifies the upper layer of negative acknowledgement and re-attempts the message transmission procedure from the beginning after a specified time period. Here, the initial transmit power does not have to be the transmit power of the previously transmitted preamble nor the transmit power of the previously transmitted message. Instead, the transmit power of the preamble can be a designated transmit power.

Although the embodiment of above discusses a confirmation of the transmitted message via the RICH, it is not limited to the RICH but can be confirmed via a different channel such as the AICH or an independent channel.

Retransmission of a message can continue on the RICH until positive acknowledgement is received or until the number of retransmission reach a maximum number set by the RRC layer. Further, a maximum number of retransmissions can be determined from the RRC layer. By repeating the retransmission procedure when necessary, the amount of data that can be transmitted on the RACH can be increased.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The invention claimed is:

1. A method of transmitting a message by a user equipment (UE) via an uplink random access channel (RACH) in a wireless communication system, the method comprising:
   initiating a first preamble access procedure with a base station (BS);
   receiving from the BS a first acknowledgement indication with respect to the first preamble access procedure;
   transmitting to the BS a first message via the RACH upon receipt of the first acknowledgement indication;
   receiving from the BS a second acknowledgment indication regarding the first message; and
   initiating with the BS a second preamble access procedure by transmitting at least one access preamble for transmitting a second message,
   wherein the second preamble access procedure comprises setting a transmit power of a first access preamble of the second preamble access procedure according to a transmit power of a last access preamble of the first preamble access procedure or a transmit power of the first message.

2. The method of claim 1, wherein the first access preamble of the second preamble access procedure and the last access preamble of the first preamble access procedure are transmitted on the RACH.

3. The method of claim 1, further comprising:
   receiving from the BS a third acknowledgment indication which indicates positive acknowledgement with respect to an access preamble of the second preamble access procedure; and
   transmitting to the BS the second message having different data from the first message upon receipt of the third acknowledgment indication if the second acknowledgement indication indicates positive acknowledgement.

4. The method of claim 1, further comprising:
   receiving from the BS a third acknowledgment indication which indicates positive acknowledgement with respect to an access preamble of the second preamble access procedure; and
   transmitting to the BS a second message including the same data as the first message upon receipt of the third acknowledgment indication if the second acknowledgement indication indicates negative acknowledgement.

5. The method of claim 1, wherein the second preamble access procedure includes transmitting the at least one access preamble until a corresponding third acknowledgement indication, which indicates positive acknowledgement with respect to an access preamble of the second preamble access procedure, is received from the BS.

6. The method of claim 1, wherein the first acknowledgment indication is transmitted during a first part of a downlink access slot.

7. The method of claim 6, wherein the first part of the downlink access slot has a duration of 4096 chips.

8. The method of claim 6, wherein the second acknowledgement indication is transmitted during a second part of the downlink access slot.

9. The method of claim 8, wherein the second part of the downlink access slot has a duration of 1024 chips.

10. The method of claim 1, wherein a signature used in the second preamble access procedure is the same as a signature used in the first preamble access procedure or has a specific relationship with the signature used in the first preamble access procedure.

11. A method of receiving a message by a base station (BS) via an uplink random access channel (RACH) in a wireless communication system, the method comprising:
    transmitting to a user equipment (UE) a first acknowledgement indication with respect to a first preamble access procedure initiated by the UE;
    receiving from the UE a first message via the RACH after transmitting the first acknowledgement indication;
    transmitting to the UE a second acknowledgment indication regarding the first message; and
    receiving from the UE at least one access preamble of a second preamble access procedure via the RACH, wherein the second preamble access procedure is initiated by the UE for transmitting a second message to the BS,
    wherein a transmit power of a first access preamble of the second preamble access procedure is set according to a transmit power of a last access preamble of the first preamble access procedure or a transmit power of the first message.

12. The method of claim 11, further comprising:

transmitting to the UE a third acknowledgment indication which indicates positive acknowledgement with respect to an access preamble of the second preamble access procedure; and receiving from the UE a second message having different data from the first message via the RACH after transmitting the third acknowledgment indication if the second acknowledgement indication indicates positive acknowledgement.

13. The method of claim 11, further comprising:

transmitting to the UE a third acknowledgment indication which indicates positive acknowledgement with respect to an access preamble of the second preamble access procedure; and receiving from the UE a second message including the same data as the first message via the RACH after transmitting the third acknowledgment indication if the second acknowledgement indication indicates negative acknowledgement.

14. The method of claim 11, wherein a signature used in the second preamble access procedure is the same as a signature used in the first preamble access procedure or has a specific relationship with the signature used in the first preamble access procedure.

* * * * *